(12) United States Patent
Uchikawa et al.

(10) Patent No.: US 6,173,765 B1
(45) Date of Patent: Jan. 16, 2001

(54) HEAT EXCHANGE HAVING HEADER TANK

(75) Inventors: Akira Uchikawa, Nagoya; Takao Ikeda, Okazaki; Yoshihiro Iwata, Nihsio, all of (JP)

(73) Assignee: Denso Corporation, Kariya (JP)

(*) Notice: Under 35 U.S.C. 154(b), the term of this patent shall be extended for 0 days.

(21) Appl. No.: 09/487,934

(22) Filed: Jan. 20, 2000

(30) Foreign Application Priority Data

Jan. 28, 1999 (JP) .................................................. 11-020514

(51) Int. Cl.[7] ...................................................... F28F 9/02
(52) U.S. Cl. .......................... 165/173; 138/162; 403/335; 403/353
(58) Field of Search ............................ 165/173; 403/331, 403/353, 335, 338; 138/162

(56) References Cited

U.S. PATENT DOCUMENTS

| 1,028,829 | * | 6/1912 | Reuterdahl | 138/162 |
| 2,215,318 | * | 9/1940 | Bristol | 138/162 |
| 3,433,270 | * | 3/1969 | Fischer et al. | 138/162 |
| 3,866,675 | * | 2/1975 | Bardon et al. | 165/173 |
| 4,165,944 | * | 8/1979 | Sunasky | 403/254 |
| 4,802,716 | * | 2/1989 | Rock et al. | 312/330 R |
| 5,125,454 | * | 6/1992 | Creamer et al. | 165/173 |
| 5,207,738 | * | 5/1993 | Dey | 165/175 |
| 5,489,162 | * | 2/1996 | LoCicero et al. | 403/331 |
| 5,678,628 | * | 10/1997 | Aki et al. | 165/173 |

FOREIGN PATENT DOCUMENTS

| 10-132485 | 5/1998 | (JP) . |
| 10-132490 | 5/1998 | (JP) . |
| 11-311497 | 11/1999 | (JP) . |

\* cited by examiner

*Primary Examiner*—Allen Flanigan
(74) *Attorney, Agent, or Firm*—Harness, Dickey & Pierce, PLC

(57) ABSTRACT

A heat exchanger has plural tubes and a header tank formed by a first tank portion and a second tank portion. When the first tank portion and the second tank portion are assembled, a protruding portion protruding from a wall of the first tank portion is inserted into a hole formed in the second tank portion. Then, the first tank portion is slidably moved against the second tank portion in a parallel direction with respect to a longitudinal direction of the header tank until the protruding portion engages the hole. As a result, the second tank portion is partially clamped between the wall of the first tank portion and the protruding portion, and the first and second tank portions sufficiently contact each other. Therefore, undesirable clearance is restricted from being formed between the first and second tank portions, and brazing performance therebetween is improved.

13 Claims, 3 Drawing Sheets

HEAT EXCHANGE HAVING HEADER TANK

CROSS REFERENCE TO RELATED APPLICATIONS

This application relates to and claims priority from Japanese Patent Application No. 11-20514 filed on Jan. 28, 1999.

BACKGROUND OF THE INVENTION

1. Field of the Invention

The present invention relates generally to heat exchangers, and particularly to a radiator for cooling coolant flowing from an internal combustion engine.

2. Related Art

JP-A-10-132485 discloses a radiator having plural tubes and a header tank connected to the tubes. The header tank includes a core plate to which the plural tubes are connected, and a tank portion brazed to the core plate. The core plate and the tank portion are formed by pressing to reduce manufacturing cost.

However, the core plate and the tank portion may have a distortion such as warping or waviness during a manufacturing process. Therefore, when the core plate and the tank portion are tentatively assembled, a relatively large clearance may be formed between the core plate and the tank portion. As a result, brazing performance between the core plate and the tank portion may be compromised. Even when the core plate and the tank portion are formed by other processes such as drawing, the core plate and the tank portion may also be distorted during the manufacturing process, thereby compromising the brazing performance between the core portion and the tank portion.

SUMMARY OF THE INVENTION

The present invention is made in light of the foregoing problems, and it is an object of the present invention to provide a heat exchanger having first and second components, in which undesirable clearance is restricted from being formed between the first and second components.

According to the present invention, a heat exchanger has a plurality of tubes and a header tank disposed at a flow-path end of the tubes to communicate with each tube. The header tank has a first tank portion and a second tank portion. The first tank portion has a protruding portion protruding from a wall of the first tank portion, and the second tank portion has a hole into which the protruding portion is inserted. The protruding portion is engaged with the hole when the first tank portion is slidably moved against the second tank portion in a parallel direction with respect to a longitudinal direction of the header tank. When the protruding portion is engaged with the hole, the second tank portion is partially clamped between the wall of the first tank portion and the protruding portion.

Therefore, when the first tank portion and the second tank portion are tentatively assembled together, the first tank portion sufficiently contacts the second tank portion, and a relatively large clearance is restricted from being formed between the first and second tank portions. As a result, brazing performance between the first and second tank portions is improved.

BRIEF DESCRIPTION OF THE DRAWINGS

This and other objects and features of the present invention will become more readily apparent from a better understanding of the preferred embodiment described below with reference to the accompanying drawings, in which.

DETAILED DESCRIPTION OF THE PREFERRED EMBODIMENT

A preferred embodiment of the present invention is described hereinafter with reference to the accompanying drawings.

Figure 1:
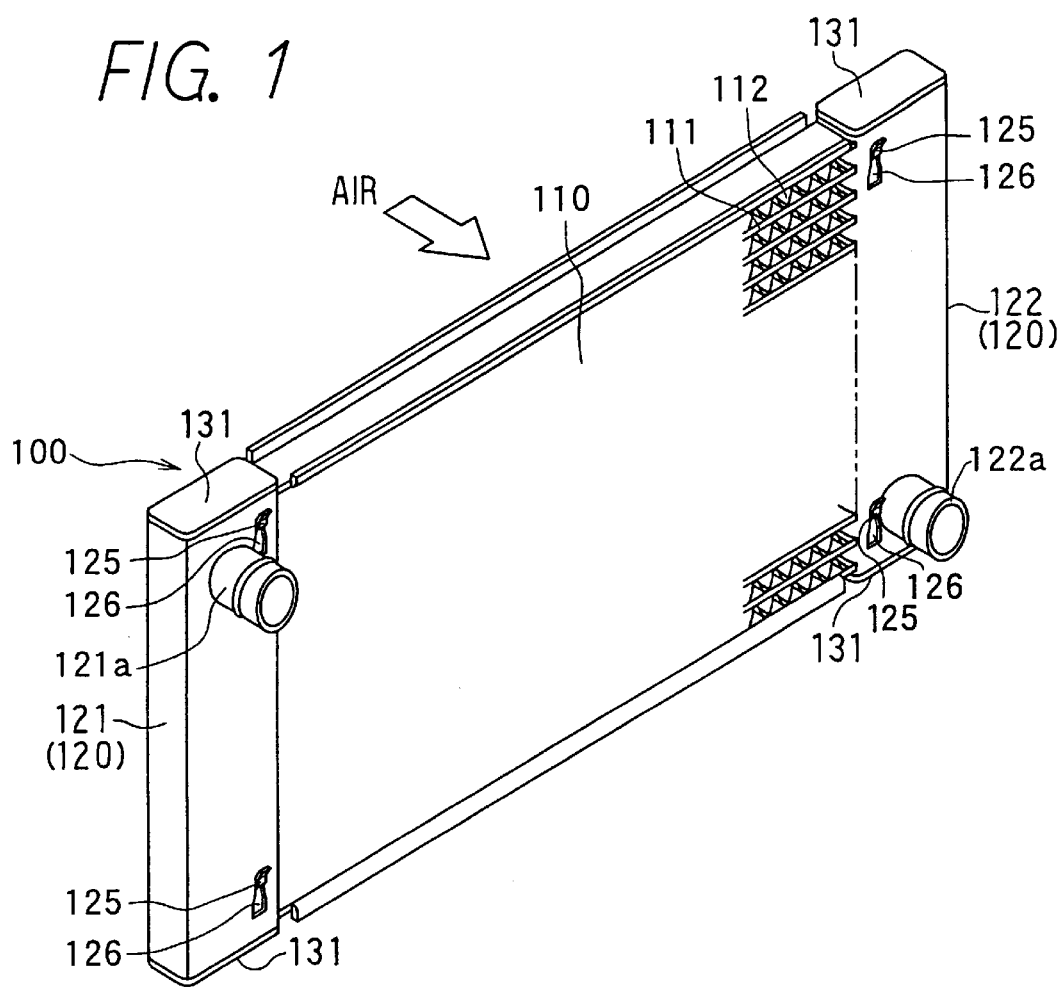
FIG. 1 is a perspective view showing a radiator according to a preferred embodiment of the present invention.

As shown in FIG. 1, a radiator 100 includes plural flat aluminum tubes 111 through which coolant flows, and plural aluminum corrugated fins 112 each of which is disposed between adjacent tubes 111. The tubes 111 and the fins 112 form a core portion 110 which performs heat-exchange between coolant and air passing through the core portion 110.

A first header tank 121 is disposed at one flow-path end of the tubes 111 (i.e., at a left end of the tubes 111 in FIG. 1) to extend in a direction perpendicular to a longitudinal direction of the tubes 111. The first header tank 121 communicates with the tubes 111 to distribute coolant to each tube 111. Similarly, a second header tank 122 is disposed at the other flow-path end of the tubes 111 (i.e., at a right end of the tubes 111 in FIG. 1) to extend in the direction perpendicular to the longitudinal direction of the tubes 111. The second header tank 122 communicates with the tubes 111 so that coolant from the tubes 111 is collected into the second header tank 122. Further, the radiator 100 has an inlet joint 121a through which coolant flows into the first inlet tank 121, and an outlet joint 122a through which coolant is discharged from the second header tank 122. The first and second header tanks 121, 122 have the same structure, and are hereinafter collectively referred to as a header tank 120.

Figure 2:
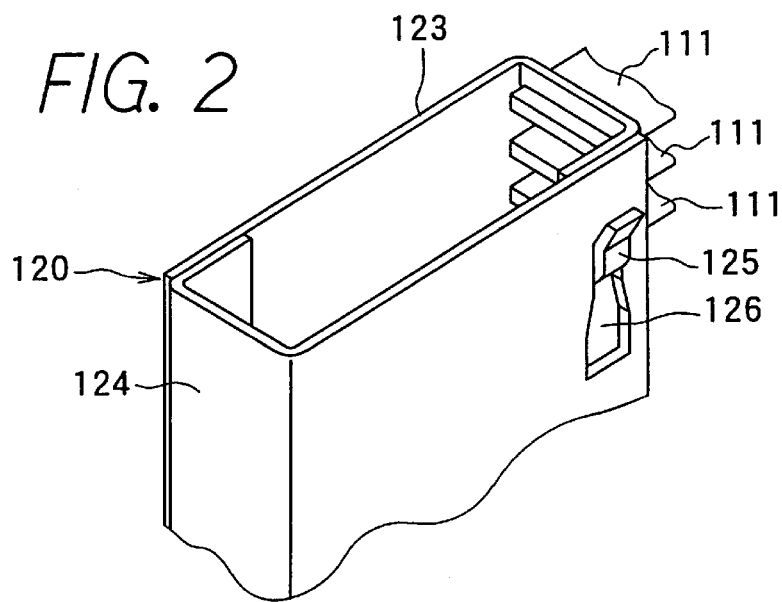
FIG. 2 is a partial perspective view showing a header tank of the radiator according to the embodiment.

As shown in FIG. 2, the header tank 120 is formed by a first tank portion 123 and a second tank portion 124 both having a J-shaped cross-section. The tubes 111 are inserted into and brazed to the header tank 120. As shown in FIG. 1, each longitudinal end of the header tank 120 is closed by a cap 131.

Figure 3:
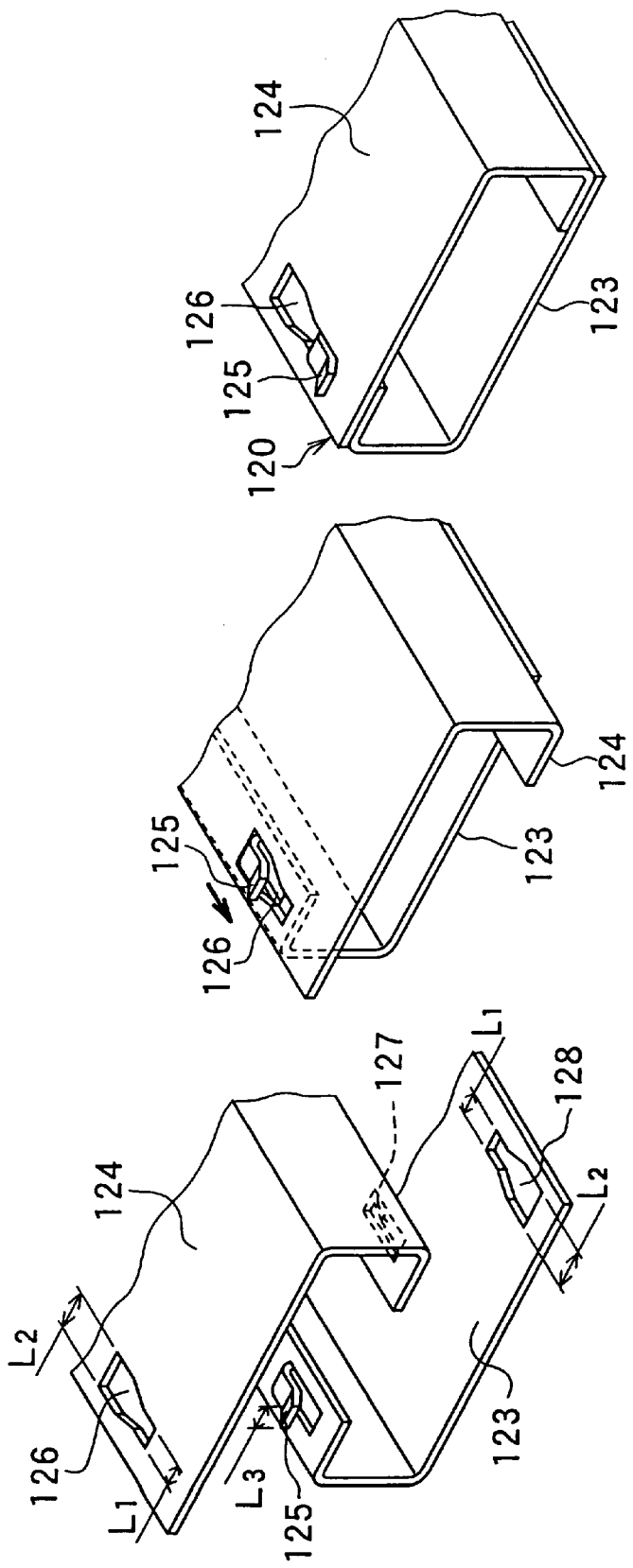
FIGS. 3A–3C are partial perspective views showing an assembling process of the header tank according to the embodiment.

Referring to FIGS. 3A–3C, the first tank portion 123 has a first protruding portion 125 formed by cutting and raising a portion of the first tank portion 123 to protrude toward the second tank portion 124. The first protruding portion 125 is formed in a wall of the first tank portion 123 to be brazed to the second tank portion 124. The second tank portion 124 has a first hole 126 at a position corresponding to the first protruding portion 125 so that the first protruding portion 125 is inserted into the first hole 126.

Figure 4:
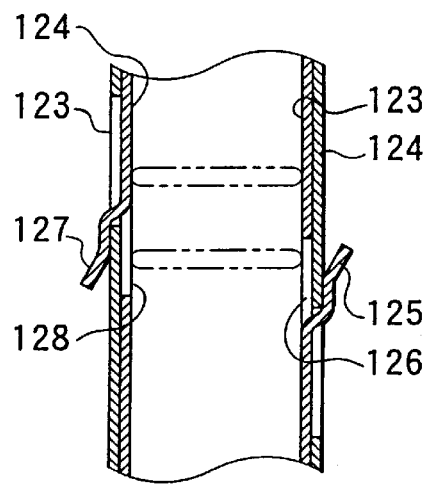
FIG. 4 is a partial longitudinal sectional view showing the header tank according to the embodiment.

Similarly, as shown in FIGS. 3A and 4, the second tank portion 124 has a second protruding portion 127 formed by cutting and raising a portion of the second tank portion 124 to protrude toward the first tank portion 123, in a wall of the second tank portion 124 to be brazed to the first tank portion 123. The first tank portion 123 has a second hole 128 into which the second protruding portion is inserted, at a position corresponding to the second protruding portion 127.

As shown in FIG. 3A, a width L1 of the first hole 126 in a direction perpendicular to a longitudinal direction of the header tank 120, at one end (i.e., at a left end in FIG. 3A) of the first hole 126 adjacent to one longitudinal end of the header tank 120 is smaller than a width L2 of the first hole 126 in the direction perpendicular to the longitudinal direction of the header tank 120, at the other end (i.e., at a right end in FIG. 3A) of the first hole 126. Thus, the first hole 126 is formed into a substantial trapezoid having a width decreased toward the one longitudinal end of the header tank 120. The second hole 128 has the similar shape as the first hole 126. However, as shown in FIG. 3A, the second hole 128 has the width L2 at one end (i.e., at a left end in FIG. 3A) of the second hole 128 adjacent to the one longitudinal end of the header tank 120, and has the width L1 at the other end (i.e., at a right end in FIG. 3A) of the second hole 128. Therefore, the second hole 128 is formed into a substantial trapezoid having a width decreased toward the other longitudinal end of the header tank 120. The width L1 is set equal to a width L3 of the first and second protruding portions 125, 127 in the direction perpendicular to the longitudinal direction of the header tank 120. The width L2 is set larger than the width L3.

Figure 5:
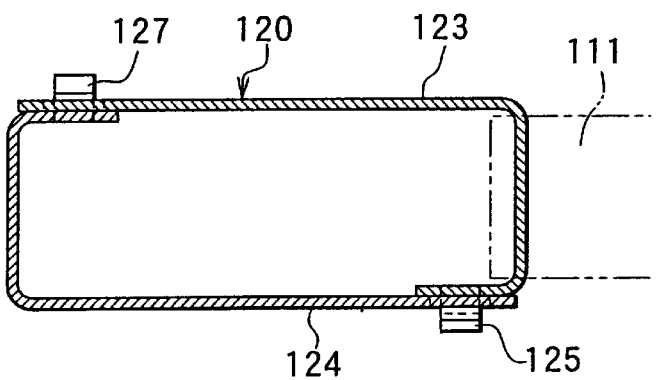
FIG. 5 is a lateral sectional view showing the header tank according to the embodiment.

Next, a manufacturing method of the header tank 120 will be described with respect to FIGS. 3A–3C. First, as shown in FIGS. 3A and 3B, the first and second protruding portions 125, 127 are respectively inserted into the first and second holes 126, 128. Next, as shown in FIG. 3B, the first tank portion 123 is slidably moved against the second tank portion in a parallel direction with respect to the longitudinal direction of the header tank 120, in a direction indicated by an arrow in FIG. 3B. As a result, as shown in FIG. 3C, the first and second protruding portions 125, 127 are respectively engaged with the first and second holes 126, 128. As shown in FIGS. 4 and 5, when the first protruding portion 125 is engaged with the first hole 126, the second tank portion 124 is partially clamped between the wall of the first tank portion 123 and the first protruding portion 125. When the second protruding portion 127 is engaged with the second hole 128, the first tank portion 123 is partially clamped between the wall of the second tank portion 124 and the second protruding portion 127.

In the present embodiment, the first and second tank portions 123, 124 are formed by pressing a clad metal plate clad with brazing material on both side surfaces. After the first and second tank portions 123, 124 are assembled together, other parts such as the caps 131 and the tubes 111 are attached to the assembled first and second tank portions 123, 124. Then, the whole assembled parts are heated in a furnace to be brazed to each other.

According to the present embodiment, during an assembly process for assembling the first tank portion 123 and the second tank portion 124, when the first protruding portion 125 is engaged with the first hole 126, the second tank portion 124 is partially clamped between the wall of the first tank portion 123 and the first protruding portion 125. When the second protruding portion 127 is engaged with the second hole 128, the first tank portion 123 is partially clamped between the wall of the second tank portion 124 and the second protruding portion 127. As a result, the first and second tank portions 123, 124 sufficiently contact each other. Therefore, when the first and second tank portions 123, 124 are tentatively assembled together, a relatively large clearance is restricted from being formed between the first and second tank portions 123, 124. As a result, brazing performance between the first and second tank portions 123, 124 is improved.

Further, in the present embodiment, the first and second tank portions 123, 124 are assembled together by respectively engaging the first and second protruding portions 125, 127 with the first and second holes 126, 128. Therefore, a jig for holding the assembled first and second tank portions 123, 124 is not required. As a result, the header tank 120 is assembled more efficiently, and the number of manufacturing processes and manufacturing cost of the radiator 100 are reduced.

Furthermore, the first and second protruding portions 125, 127 are respectively engaged with the first and second holes 126, 128 by slidably moving the first tank portion 123 against the second tank portion in a parallel direction with respect to the longitudinal direction of the header tank 120. Therefore, when the first and second tank portions 123, 124 are assembled together, each distortion of the first and second tank portions 123, 124 such as warping or waviness is substantially straighten by each other. As a result, accuracy in a finished size of the radiator 100 is improved.

Figure 6:
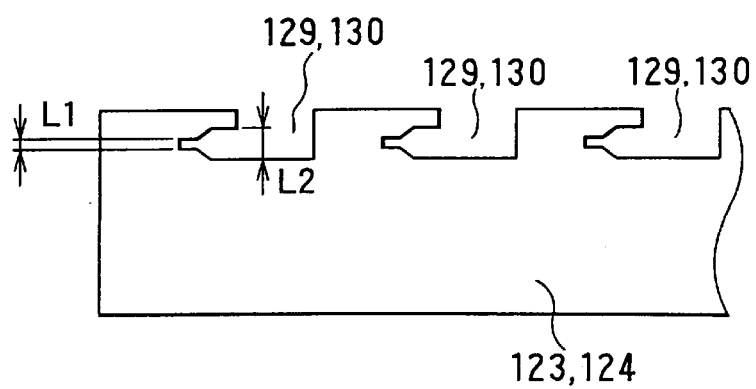
FIG. 6 is a schematic view showing a hole of a header tank of a heat exchanger according to a modification of the embodiment.

In the above-mentioned embodiment, the first and second protruding portions 125, 127 may protrude toward an inside of the header tank 120. In this case, since flow resistance of coolant in the header tank 120 may be increased, each position and protruding length of the first and second protruding portions 125, 127 needs to be appropriately determined. Further, the present invention is not limited to the radiator, but may be applied to any other heat exchangers such as an indoor heat exchanger or an outdoor heat exchanger of an air conditioner. Also, as shown in FIG. 6, the first and second holes 126, 128 may be respectively holes 129, 130 formed by partially cutting out the first and second tank portions 123, 124.

Although the present invention has been fully described in connection with a preferred embodiment thereof with reference to the accompanying drawings, it is to be noted that various changes and modifications will become apparent to those skilled in the art. Such changes and modifications are to be understood as being within the scope of the present invention as defined by the appended claims.

What is claimed is:

1. A heat exchanger comprising:
   a plurality of tubes through which fluid flows; and
   a header tank disposed at each flow-path end of the tubes to extend in a direction perpendicular to a longitudinal direction of each tube, and communicating with each tube, the header tank including first and second tank portions extending in a longitudinal direction of the header tank, wherein:
   the first tank portion has a protruding portion protruding from a wall of the first tank portion, and the second tank portion has a hole into which the protruding portion is inserted, so that the protruding portion is engaged with the hole when the first tank portion is slidably moved against the second tank portion in a parallel direction with respect to the longitudinal direction of the header tank; and
   the second tank portion is partially clamped between the wall of the first tank portion and the protruding portion when the protruding portion is engaged with the hole.

2. The heat exchanger according to claim 1, wherein a first width of the hole in a direction perpendicular to the longitudinal direction of the header tank, adjacent to a first longitudinal end of the header tank is smaller than a second width of the hole in the direction perpendicular to the longitudinal direction of the header tank, adjacent to a second longitudinal end of the header tank.

3. The heat exchanger according to claim 1, wherein the hole is formed into a substantial trapezoid having a width in a direction perpendicular to the longitudinal direction of the header tank, the width being decreased toward one longitudinal end of the header tank.

4. The heat exchanger according to claim 1, wherein the protruding portion is formed by cutting and raising a portion of the first tank portion.

5. The heat exchanger according to claim 1, wherein the protruding portion protrudes outwardly with respect to the header tank.

6. The heat exchanger according to claim 2, wherein a width of the protruding portion in the direction perpendicular to the longitudinal direction of the header tank is substantially equal to the first width of the hole, and is smaller than the second width of the hole.

7. The heat exchanger according to claim 3, wherein:

the second tank portion has a protruding portion protruding from a wall of the second tank portion, and the first tank portion has a hole into which the protruding portion of the second tank portion is inserted; and the hole of the first tank portion has a substantially same shape as the hole of the second tank portion, and is disposed in an opposite direction to the hole of the second tank portion.

8. The heat exchanger according to claim 1, wherein the first and second tank portions are formed by pressing.

9. The heat exchanger according to claim 1, wherein the first and second tank portions are made from a clad metal plate clad with brazing material on both side surfaces, and are brazed to each other through the brazing material.

10. A manufacturing method for a header tank of a heat exchanger, the header tank including a first tank portion having a protruding portion protruding from a wall of the first tank portion, and a second tank portion having a hole into which the protruding portion is inserted, the method comprising the steps of:

inserting the protruding portion into the hole;

slidably moving the first tank portion against the second tank portion in a parallel direction with respect to a longitudinal direction of the header tank until the protruding portion engages the hole, so that the second tank portion is partially clamped between the protruding portion and the wall of the first tank portion; and brazing the first tank portion to the second tank portion.

11. The method according to claim 10, wherein:

the hole has a first width and a second width in a direction perpendicular to the longitudinal direction of the header tank; and the first width is smaller than the second width.

12. The method according to claim 11, wherein the first width is substantially equal to a width of the protruding portion in the direction perpendicular to the longitudinal direction of the header tank.

13. A heat exchanger comprising:

a plurality of tubes through which fluid flows; and a header tank disposed at each flow-path end of the tubes, the header tank divided lengthwise into first and second tank portions, wherein:

the first tank portion has an engagement member formed on a wall of the first tank portion; and the second tank portion has a first hole and a second hole integrally formed and disposed in parallel with each other, the second hole having a width smaller than that of the first hole, and engaging with the engagement member such that the second tank portion around the second hole is partially clamped between the engagement member and the wall of the first tank portion.

* * * * *